(12) United States Patent
Nelson

(10) Patent No.: US 9,366,193 B2
(45) Date of Patent: Jun. 14, 2016

(54) ADJUSTING MOTOR POWER

(76) Inventor: Les F. Nelson, Cape Coral, FL (US)

( * ) Notice: Subject to any disclaimer, the term of this patent is extended or adjusted under 35 U.S.C. 154(b) by 1636 days.

(21) Appl. No.: 12/641,515

(22) Filed: Dec. 18, 2009
(Under 37 CFR 1.47)

(65) Prior Publication Data
US 2011/0146287 A1 Jun. 23, 2011

(51) Int. Cl.
H02P 1/54 (2006.01)
F02C 9/00 (2006.01)
H02P 6/08 (2016.01)
H02P 27/06 (2006.01)

(52) U.S. Cl.
CPC ... F02C 9/00 (2013.01); H02P 6/08 (2013.01); H02P 27/06 (2013.01); H02P 2201/07 (2013.01)

(58) Field of Classification Search
USPC .............. 318/34, 98, 560, 700, 720, 722
See application file for complete search history.

(56) References Cited

U.S. PATENT DOCUMENTS

| 4,638,149 A | 1/1987 | Wessel et al. |
| 4,700,120 A * | 10/1987 | Janes ................ G05B 19/416 318/696 |
| 5,734,258 A | 3/1998 | Esser |
| 6,031,299 A | 2/2000 | Stumfall et al. |
| 6,104,172 A | 8/2000 | Josephs et al. |
| 6,137,280 A | 10/2000 | Ackermann et al. |
| 6,344,986 B1 | 2/2002 | Jain et al. |
| 6,392,322 B1 | 5/2002 | Mares et al. |
| 6,600,289 B2 * | 7/2003 | George et al. ................ 318/727 |
| 6,856,045 B1 | 2/2005 | Beneditz et al. |
| 7,123,494 B2 | 10/2006 | Turchi |
| 7,224,147 B2 | 5/2007 | Shah et al. |
| 7,304,445 B2 * | 12/2007 | Donnelly ...................... 318/108 |
| 7,369,079 B2 | 5/2008 | Maier |
| 8,013,548 B2 * | 9/2011 | King et al. .................... 318/139 |
| 2004/0027078 A1 * | 2/2004 | Xu .......................... F02C 7/268 318/107 |
| 2004/0189226 A1 * | 9/2004 | King ........................... 318/375 |
| 2005/0001567 A1 * | 1/2005 | Yoshimatsu .......... E02F 9/2075 318/34 |
| 2006/0061307 A1 * | 3/2006 | Donnelly ...................... 318/108 |
| 2006/0197489 A1 * | 9/2006 | Nakai ...................... F16H 61/32 318/701 |
| 2007/0040529 A1 * | 2/2007 | Takebayashi .......... G05B 19/40 318/685 |
| 2007/0194762 A1 | 8/2007 | Shah et al. |
| 2007/0247091 A1 * | 10/2007 | Maiocchi ...................... 318/254 |
| 2008/0001564 A1 * | 1/2008 | Tate et al. ..................... 318/434 |
| 2008/0122393 A1 * | 5/2008 | Negoro et al. ................ 318/552 |
| 2009/0309422 A1 * | 12/2009 | Helmick ................... B60L 7/16 307/53 |
| 2015/0210171 A1 * | 7/2015 | King ................... B60L 11/1803 318/139 |

* cited by examiner

Primary Examiner — Kawing Chan

(57) ABSTRACT

An example power management arrangement includes a motor controller configured to communicate power to a motor drive bridge to drive a motor. The motor controller is configurable to selectively receive power from each of a first power supply and a second power supply. The voltage of the power from the first power supply is different than a voltage of the power from the second power supply. An example power adjusting method includes receiving power at a motor controller, adjusting a voltage of the received power using the motor controller, communicating the power with the adjusted voltage from the motor controller to a motor drive bridge to drive a motor.

13 Claims, 3 Drawing Sheets

ADJUSTING MOTOR POWER

BACKGROUND

This application relates generally to adjusting power. More particularly, this application relates to adjusting a voltage of power.

Power conversion products, such as servo position-control drives, motor speed-control drives, power supplies, etc., typically utilize relatively unmodified power. The power moves directly from a single bus power source to a servo position-control drive, for example. The power may be processed to protect the quality of the provided power. The processing does not significantly change the power. The processing is typically limited to filtering electromagnet interference from the power or to a factor correction of the power.

In a prior art arrangement, a motor assembly includes a servo motor portion and a motor controller portion. The motor assembly is configured to actuate a fuel valve or other engine components within a gas turbine engine, such as bleed valves or compressor variable geometries. The motor controller receives unaltered power directly from a single bus. The motor controller communicates the power to the servo motor. The prior art motor assembly is not able to receive power from another bus having another bus voltage. The servo motor assembly typically includes heat sinks that are used to communicate thermal energy away from the servo motor. The heat sinks undesirably increase the size of the servo motor assembly. The motor is unitary electric motor, for example, and includes an actuator assembly having an explosion-proof construction that facilitates use in explosive gas environments.

SUMMARY

An example power management arrangement includes a motor controller configured to communicate power to a motor drive bridge to drive a motor. The motor controller is configurable to selectively receive power from each of a first power supply and a second power supply. The voltage of the power from the first power supply is different than a voltage of the power from the second power supply.

An example power adjusting method includes receiving power at a motor controller, adjusting a voltage of the received power using the motor controller, communicating the power with the adjusted voltage from the motor controller to a motor drive bridge to drive a motor.

Another example method of powering a motor includes receiving power at a motor controller, using the motor controller to adjust a voltage of the received power, powering components of a motor using the power having the adjusted voltage.

These and other features of the example disclosure can be best understood from the following specification and drawings, the following of which is a brief description:

DETAILED DESCRIPTION

Figure 1:
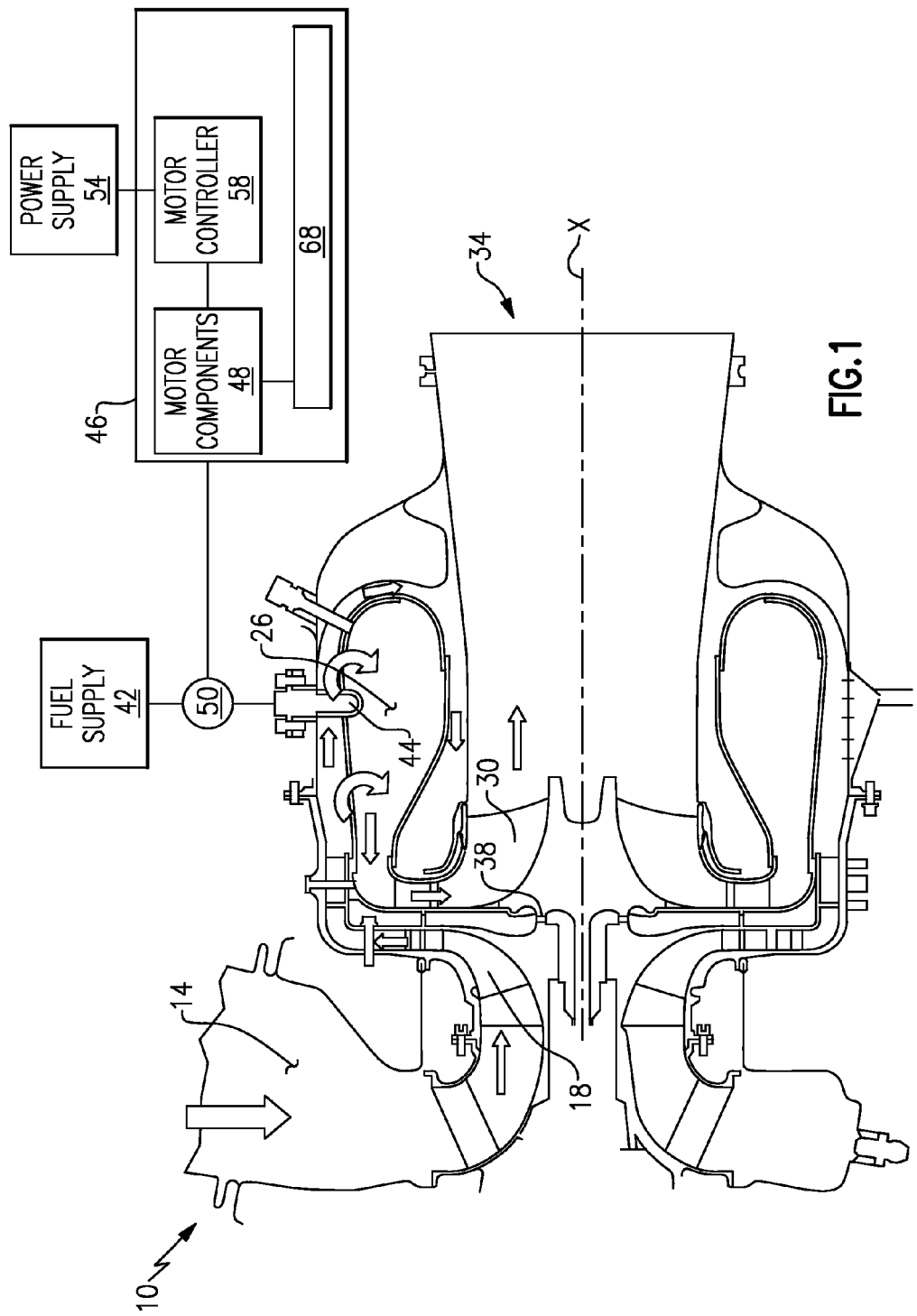
FIG. 1 shows a schematic view of an example gas turbine engine having a power management arrangement.
Figure 2:
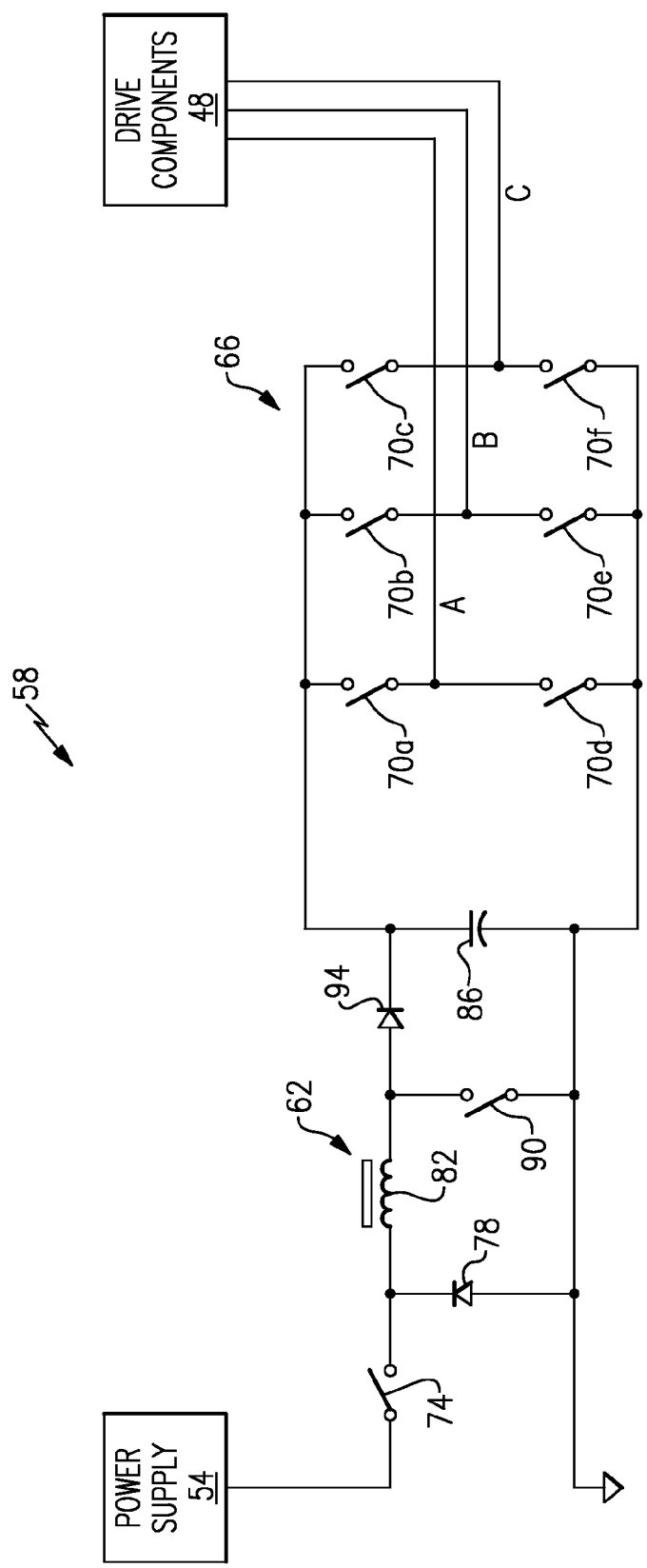
FIG. 2 shows a schematic view of the FIG. 1 power management arrangement.

Referring to FIGS. 1 and 2, an example gas turbine engine 10 includes (in serial flow communication) an inlet section 14, a centrifugal compressor 18, a combustor section 26, a turbine wheel 30, and a turbine exhaust 34. The gas turbine engine 10 is circumferentially disposed about an engine centerline X. During operation, air is pulled into the gas turbine engine 10 by the inlet section 14, pressurized by the centrifugal compressor 18, mixed with fuel, and burned in the combustor section 26. The turbine wheel 30 extracts energy from the hot combustion gases flowing from the combustor section 26.

The turbine wheel 30 utilizes the extracted energy from the hot combustion gases to power the centrifugal compressor 18. The examples described in this disclosure are not limited to the radial turbine type auxiliary power units described, however, and may be used in axial architectures. The examples also may be used in gas turbine engines that are single-spool designs, two-spool designs, and three-spool designs. That is, there are various types of engines and engine architectures that could benefit from the examples disclosed herein, which are not limited to the radial turbine design shown.

The combustor section 26 of the gas turbine engine 10 is configured to receive fuel from a fuel supply 42. In this example, the fuel is sprayed from an injector 44 into the combustor section 26.

A motor assembly 46 has motor components 48 controlled by a motor controller 58. The motor assembly 46 is a servo motor assembly in this example. The motor components 48, such as rotors and coils, are configured to actuate a valve 50 to control the flow of fuel between the fuel supply 42 and the combustor section 26. In another example, the motor components 48 are configured to actuate a bleed valve or to vary geometries of the compressor 18.

The motor assembly 46 also includes a heat sink 68 that helps remove thermal energy from the motor assembly 46 that is generated during operation.

The examples described in this disclosure are not limited to the motor assembly 46 that controls the valve 50 of the gas turbine engine 10. That is, other types of motors in other environments would benefit from teachings of the examples described in this disclosure. In other examples, the motor assembly 46 is used in factory automation, process control (fluids, gases, etc.), structural testing, aircraft simulators, etc., which use electric actuators with motor controllers and single power buses.

The example motor assembly 46 is powered by a power supply 54 having a bus voltage of about 120 V. Other examples of the gas turbine engine 10 utilize power supplies having different bus voltages, such as 12 V, 24 V, 48 V, etc.

In this example, the motor controller 58 includes a power management section 62 and a motor drive bridge section 66. Power moves from the power supply 54 through the power management section 62 before moving to the motor drive bridge section 66. The motor controller 58 is part of the motor assembly 46 in this example. In another example, the motor controller 58 is separate from the motor assembly 46.

The example power management section 62 has a buck boost portion that adjusts the voltage of power from the power supply 54 to a level appropriate for driving the motor components 48. In one example, the power management section 62 adjusts the voltage of the received power downward from 120 V to 60 V before the power reaches the motor drive bridge section 66. That is, the power enters the power management section 62 at 120 V and exits the power management section 62 at 60 V. Adjusting the voltage allows the motor assembly to be powered by bus voltages ranging from 60 V to 120 V.

The example power management section 62 includes at least one switch 74, at least one diode 78, and an inductor 82. A person skilled in the art and having benefit of this disclosure would understand how to reduce a voltage of the power provided by the power supply 54 using the power management section 62. As can be appreciated, the adjustments to the voltage by the power management section 62 are more substantial than the prior art arrangements that processed power.

The example motor drive bridge section 66 includes a plurality of switches 70a-70f that are used to regulate current to the motor assembly 46. One or more of phases A-C are typically energized to hold the motor assembly 46 in a given position. The switches 70a-70f control which phases A-C are energized. In one example, phases A and B are energized by pulse width modulating the switch 70a while allowing current to move through a reverse diode of the switch 70b. Example switches 70a-70f include insolated gate bipolar transistors (IGBTs) and field effect transistors (FETs) or some combination of these.

In one example, the motor assembly 46 is driven at 20A with a terminal winding resistance of 0.25 ohms. The motor assembly 46 utilizes IGBTs as switches 70a-70f that have a forward voltage of 1.6 V, a switching time ($T_{sw}$) of 150 nsec, an inverse diode forward voltage of 1.5 V and a switching frequency of 15 kHz. Such an example generates about 73 Watts of thermal energy (motor drive bridge loss), which is calculated as follows:

Motor drive bridge loss =
[Upper IGBT Switching Loss] + [Upper IGBT DC Loss] +
[Lower Drive IGBT DC Loss] +
[Lower Free-Wheeling IGBT Diode Loss] =

$$2 * \int T_{SW}[V_{IGBT} * I_{IGBT}]dt + \int T_{on}[V_{IGBT} * I_{IGBT}]dt +$$

$$V_{IGBT} * I_{IGBT} + \int T_{off}[V_{IGBTDiode} * I_{IGBT}]dt =$$

$$[2 * V_{rail} * I_m * T_{SW} / T] + [V_{IGBT} * I_m * T_{on} / T] +$$

$$[I_m * V_{IGBT}] + [I_m * V_{IGBTDiode} * T_{off} / T] =$$

$$[2 * 120 * 20 * 150e\text{-}9 / 66.7e\text{-}6] +$$

$$[1.6 * 20 * 2.78e\text{-}6 / 66.7e\text{-}6] + [20^2 * 1.6] +$$

$$[20 * 1.5 * 63.9e\text{-}6 / 66.7e\text{-}6] \approx 73 \text{ Watts}$$

In another example, 250 V FETs are used as switches 70a-70f in place of the IGBTs. The 250 V FETs have an inverse diode forward voltage of 1.5V and a terminal winding resistance (Rdson) of 40 mOhms at 100 degrees C. Such an example generates about 43 Watts of thermal energy (motor drive bridge loss), which is calculated as follows:

Motor drive bridge loss = [Upper FET Switching Loss] +
[Upper FET DC Loss] + [Lower Drive FET DC Loss] +
[Lower Free-Wheeling FET Switching Loss] +
[Lower Free-Wheeling FET DC Loss] +
[Lower Free-Wheeling FET Diode Dead-Time Loss] =

$$2 * \int T_{SW}[V_{FET} * I_{FET}]dt + \int T_{on}[R_{DSon} * I_{FET}^2]dt +$$

$$R_{DSon} * I_{FET}^2 + 2 * \int_{TSW} [V_{FET} * I_{FET}]dt +$$

$$\int T_{off}[R_{DSon} * I_{FET}^2]dt + \int T_{dead}[V_{FETDiode} * I_{FET}]dt =$$

$$[2 * V_{rail} * I_m * T_{SW} / T] + [R_{DSon} * I_m^2 * T_{on} / T] +$$

$$[I_m^2 * R_{dson}] + [2 * V_{FETDiode} * I_m *$$

$$T_{SW} / T] + [I_m^2 * R_{dson} T_{off} /$$

$$T] + [V_{FETDiode} * I_m * T_{DeadSW} / T] =$$

$$[2 * 120 * 20 * 150e\text{-}9 / 66.7e\text{-}6] +$$

$$[.008 * 20^2 * 2.78e\text{-}6 / 66.7e\text{-}6] +$$

$$[20^2 * .008] +$$

$$[2 * 1.5 * 20 * 150e\text{-}9 / 66.7e\text{-}6] +$$

$$[20^2 * .008 * 63.9e\text{-}6 / 66.7e\text{-}6] + [1.5 *$$

$$20 * 300e\text{-}9 / 66.7e\text{-}6] \approx 43 \text{ Watts}$$

In another example, 100 V FETs are used as switches 70a-70f in place of the IGBTs. The 100 V FETs have an inverse diode forward voltage of 1.5V and a terminal winding resistance (Rdson) of 8.0 mOhms at a junction temperature of 100 degrees C. Such an example generates about 18 Watts of thermal energy or motor drive bridge loss, which is calculated as follows:

Motor drive bridge loss = [Upper FET Switching Loss] +
[Upper FET DC Loss] + [Lower Drive FET DC Loss] +
Lower Free-Wheeling FET Switching Loss] +
[Lower Free-Wheeling FET DC Loss] +
[Lower Free-Wheeling FET Diode Dead-Time Loss] =

$$2 * \int T_{SW}[V_{FET} * I_{FET}]dt + \int T_{on}[R_{DSon} * I_{FET}^2]dt +$$

$$R_{DSon} * I_{FET}^2 + 2 * \int_{TSW} [V_{FET} * I_{FET}]dt +$$

$$\int T_{off}[R_{DSon} * I_{FET}^2]dt + \int T_{dead}[V_{FETDiode} * I_{FET}]dt =$$

$$[2 * V_{rail} * I_m * T_{SW} / T] + [R_{DSon} * I_m^2 *$$

$$T_{on} / T] + [I_m^2 * R_{dson}] + [2 * V_{FETDiode} *$$

$$I_m * T_{SW} / T] + [I_m^2 * R_{dson} T_{off} /$$

$$T] + + [V_{FETDiode} * I_m * T_{DeadSW} / T] =$$

$$[2 * 120 * 20 * 150e\text{-}9 / 66.7e\text{-}6] +$$

$$[.008 * 20^2 * 2.78e\text{-}6 / 66.7e\text{-}6] +$$

$$[20^2 * .008] +$$

$$[2 * 1.5 * 20 * 150e\text{-}9 / 66.7e\text{-}6] +$$

$$[20^2 * .008 * 63.9e\text{-}6 / 66.7e\text{-}6] + [1.5 *$$

$$20 * 300e\text{-}9 / 66.7e\text{-}6] \approx 18 \text{ Watts}$$

As can be appreciated from the above calculations, the example incorporating the 100 V FETs generates less thermal energy than the other examples. The power management section 62 in this example reduces the voltage from a 120 VDC source to a level suitable for using with the 100 V FETs, such as reducing the 120 V to 60 V. As less thermal energy is generated, the motor assembly 46 can have a smaller area devoted to the heat sink 68 and a smaller enclosure. Reducing the voltage of the power sent to the motor assembly 46 thus facilitates selecting the motor assembly 46 having a relatively small spatial envelope.

In another example, the motor assembly 46 was previously used in another application where the motor assembly 46 was provided power by another power supply (not shown) having a bus voltage of 24 V. The input voltage to the motor assembly 46 is increased from 24 V to 60 V using the buck boost power management section 62 in such an example for use by the motor assembly 46. The buck boost power management section 62 may utilize a switch 90 and a diode 94 to increase the voltage in this manner. The buck boost power management section 62 is thus configured to adjust the voltage upward in some examples.

Figure 3:
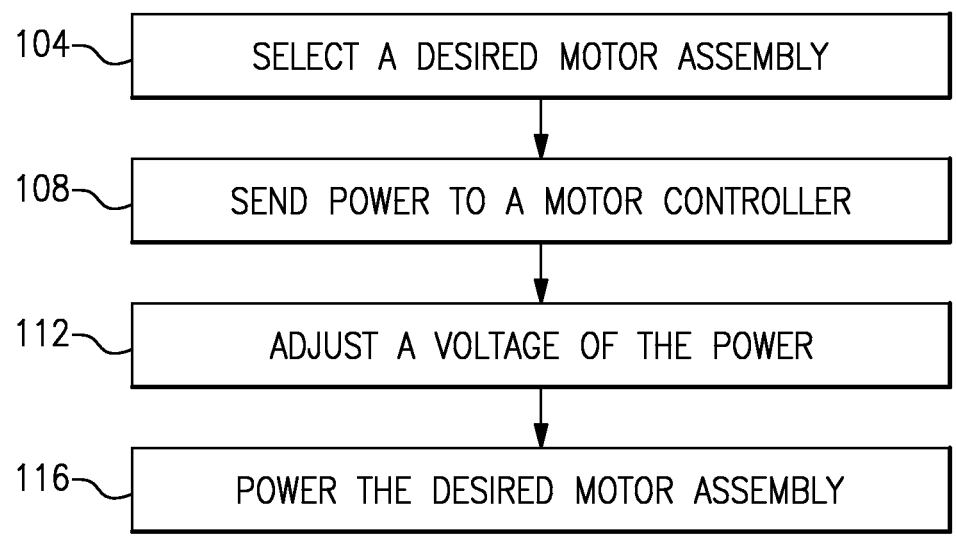
FIG. 3 shows a flow of an example power adjusting method.

Referring now to FIG. 3 with continuing reference to FIG. 2, an example method 100 of adjusting power includes a step 104 of selecting desired motor assembly 46. The selection is based on the available spatial envelope for the motor assembly 46 within the gas turbine engine 10 in one example. In another example, the selection is based on the cost of the motor assembly 46.

At step 108, the method 100 sends power to the motor controller 58 from the power supply 54, which supplies power at 120 V in this example At step 112, the voltage of the power is adjusted using the power management section 62 of the motor controller 58. The voltage is adjusted to a level appropriate for use with the motor assembly 46 selected in the step 104. In some examples, the voltage is adjusted downward. In other examples, the voltage is adjusted upwards the adjustments to the voltage are greater than 10% in this example.

At step 116, the adjusted power from step 112 is communicated from the power converter 58 to the motor assembly 46 selected in the step 104. The motor assembly 46 powers the valve 50, for example.

Features of the disclosed examples include adjusting the voltage of power provided by a bus to match the voltage requirements of a desired motor assembly. The motor assembly is selected based on the spatial envelope available for mounting the motor or based on the availability of the motor assembly, for example.

Although a preferred embodiment has been disclosed, a worker of ordinary skill in this art would recognize that certain modifications would come within the scope of this invention. For that reason, the following claims should be studied to determine the true scope and content of this invention.

I claim:

1. A method of powering a motor comprising:
   receiving power at a motor controller;
   using the motor controller to adjust a voltage of the received power;
   powering components of a motor using the power having the adjusted voltage; and
   adjusting a component of a gas turbine engine using the motor, wherein the motor controller is configured to selectively receive power from a first power supply or a second power supply, wherein the power provided by first power supply has a first bus voltage and the power provided by the second power supply has a second bus voltage different than the first bus voltage.

2. The method of claim 1 wherein the adjusting increases or decreases the voltage of the received power more than 10%.

3. The method of claim 1 wherein the first bus voltage is about twice as large as the second bus voltage.

4. The method of claim 1 wherein the motor controller comprises a buck boost portion used to adjust the voltage.

5. The method of claim 1 wherein the motor is a servo motor.

6. The method of claim 5 wherein the servo motor is configured to control a valve within the gas turbine engine.

7. The method of claim 1, wherein the component is a bleed valve that is actuated by the motor.

8. The method of claim 1, including using the power having the adjusted voltage to selectively activate phases of the motor to hold the motor in a given position, wherein switches are selectively modulated to activate the switches.

9. A power management arrangement comprising:
   a motor controller configured to communicate power to a motor drive bridge to drive a motor, wherein the motor controller is configurable to selectively receive power from each of a first power supply and a second power supply, wherein a voltage of power from the first power supply is different than a voltage of power from the second power supply.

10. The arrangement of claim 9 wherein the motor controller adjusts a voltage of power from the selected one of the first power supply or the second power supply.

11. The arrangement of claim 10 wherein the motor controller adjust the voltage more than 10%.

12. The arrangement of claim 9 wherein the motor controller comprises a buck boost circuit.

13. The arrangement of claim 9 wherein the motor controller is configured to control a servo motor.

\* \* \* \* \*